(12) United States Patent
Leinonen et al.

(10) Patent No.: US 11,569,864 B2
(45) Date of Patent: Jan. 31, 2023

(54) CONFIGURABLE ANTENNA ARRANGEMENTS

(71) Applicant: NOKIA SOLUTIONS AND NETWORKS OY, Espoo (FI)

(72) Inventors: Marko Leinonen, Oulu (FI); Aarno Pärssinen, Espoo (FI); Rana Shaheen, Oulu (FI); Rehman Akbar, Oulu (FI); Alok Sethi, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/824,745

(22) Filed: Mar. 20, 2020

(65) Prior Publication Data
US 2020/0304164 A1 Sep. 24, 2020

(30) Foreign Application Priority Data

Mar. 21, 2019 (EP) .................................... 19164213

(51) Int. Cl.
*H04B 1/44* (2006.01)
*H01Q 1/24* (2006.01)
(Continued)

(52) U.S. Cl.
CPC .............. *H04B 1/44* (2013.01); *H01Q 1/243* (2013.01); *H01Q 1/525* (2013.01); *H01Q 21/0025* (2013.01)

(58) Field of Classification Search
CPC .......... H04B 1/44; H04B 1/40; H04B 7/0617; H01Q 1/243; H01Q 1/525; H01Q 21/0025;
(Continued)

(56) References Cited

U.S. PATENT DOCUMENTS

| 5,565,873 A | 10/1996 | Dean |
| 6,021,317 A * | 2/2000 | Irvin ...................... H01Q 1/241 |
| | | 455/101 |

(Continued)

FOREIGN PATENT DOCUMENTS

| CN | 104620551 A | 5/2015 |
| GB | 2 232 536 A | 12/1990 |
| WO | WO 2018/142132 A | 8/2018 |

OTHER PUBLICATIONS

Kim, H-T. et al., *A 28GHz CMOS Direct Conversion Transceiver With Packaged Antenna Arrays for 5G Cellular System*, IEEE Radio Frequency Integrated Circuits Symposium (2017) 69-72.

(Continued)

*Primary Examiner* — Nguyen T Vo
(74) *Attorney, Agent, or Firm* — Alston & Bird LLP

(57) ABSTRACT

An apparatus is provided that includes a set of antenna elements and switching nodes. Each switching node has physical interconnects to a sub-set of the antenna elements for transferring communication signals and the switching nodes have physical interconnects to other switching nodes forming a network of switching nodes for transferring communication signals between switching nodes. The apparatus also includes a controller for controlling operation of switching nodes to control use of the physical interconnects between switching nodes and control creation of different patterns of antenna elements operationally interconnected via multiple operationally interconnected switching nodes.

18 Claims, 13 Drawing Sheets

(51) Int. Cl.
*H01Q 1/52* (2006.01)
*H01Q 21/00* (2006.01)

(58) Field of Classification Search
CPC .......... H01Q 21/065; H01Q 3/01; H01Q 3/24; H01Q 3/26
See application file for complete search history.

(56) References Cited

U.S. PATENT DOCUMENTS

| | | | |
|---|---|---|---|
| 7,129,908 B2 | 10/2006 | Edward et al. | |
| 10,056,922 B1 | 8/2018 | Tsvelykh et al. | |
| 10,594,357 B2* | 3/2020 | Tombak | H03K 17/693 |
| 2010/0079347 A1* | 4/2010 | Hayes | H01Q 3/2682 |
| | | | 343/705 |
| 2011/0175791 A1* | 7/2011 | Ozdemir | H01Q 21/245 |
| | | | 343/876 |
| 2013/0210356 A1* | 8/2013 | Yuan | H04B 7/0404 |
| | | | 455/41.2 |
| 2013/0286960 A1 | 10/2013 | Li et al. | |
| 2014/0139373 A1* | 5/2014 | Tseng | H01Q 3/40 |
| | | | 342/374 |
| 2015/0280773 A1* | 10/2015 | Chang | H04B 1/44 |
| | | | 455/78 |
| 2016/0218425 A1 | 7/2016 | Maohamadi | |
| 2018/0069605 A1 | 3/2018 | Gharavi et al. | |
| 2018/0101705 A1* | 4/2018 | Martinez | G06K 7/10356 |
| 2018/0199258 A1 | 7/2018 | Cezanne et al. | |
| 2018/0234117 A1 | 8/2018 | Saban et al. | |
| 2018/0269948 A1 | 9/2018 | Wang et al. | |
| 2020/0227824 A1* | 7/2020 | Abdalla | H01Q 21/0025 |
| 2021/0313679 A1* | 10/2021 | Zhong | H01Q 3/2682 |

OTHER PUBLICATIONS

Krishnaswamy, H. et al., *Analog and RF Interference Mitigation for Integrated MIMO Receiver Arrays*, Proceedings of the IEEE, vol. 104, No. 3 (Mar. 2016) 561-575.

Kursu, O. et al., *Design and Measurement of a 5G mmW Mobile Backhaul Transceiver at 28 GHz*, EURASIP Journal on Wireless Communications and Networking (2018) 11 pages.

Mondal, S. et al., *A 25-30 GHz Fully-Connected Hybrid Beamforming Receiver for MIMO Communication*, IEEE Journal of Solid-State Circuits, vol. 53, No. 5 (May 2018) 1275-1287.

Sadhu, B. et al., *A 28GHz 32-Element Phased-Array Transceiver IC With Concurrent Dual Polarized Beams and 1.4 Degree Beam-Steering Resolution for 5G Communication*, ISSCC 2017 / Session 7/ Wireless Transceivers / 7.2, 2017 IEEE International Solid-State Circuits Conference (2017) 6-8.

Shahramian, S. et al., *A Fully Integrated Scalable W-Band Phased-Array Module With Integrated Antennas, Self-Alignment and Self-Test*, ISSCC 2018 /Session 4/ mm-Wave Radios for 5G and Beyond / 4.6, IEEE International Solid-State Circuits Conference (2018) 3 pages.

Shimura, T. et al., *A 28-GHz CMOS 2 × 4 Phased Array Chip With High-Precision Phase-Adjusting Function Between Subarrays for Beam Multiplexing*, Proceedings of the $48^{th}$ European Microwave Conference (Sep. 2018) 1305-1308.

Sowlati, T. et al., *A 60HGz 144-Element Phased-Array Transceiver With 51dBm Maximum EIRP and ±60° Beam Steering For Backhaul Application*, ISSCC 2018 / Session 4 / mm-Wave Radios for 5G and Beyond / 4.2, IEEE International Solid-State Circuits Conference (2018) 3 pages.

How to Aim a Yagi Directional Outside Antenna [online] [retrieved Apr. 13, 2020]. Retrieved via the Internet: https://www.ubersignal.com/how-to-aim-yagi-directional-outside-antenna (2020) 4 pages.

Office Action for Chinese Application No. 202010201968.6 dated May 28, 2021, 10 pages.

Extended European Search Report for EP Application No. 19164213.1 dated Jul. 23, 2019, 18 pages.

Office Action for Chinese Application No. 202010201968.6 dated Nov. 22, 2021, 6 pages.

Office Action for European Application No. 19164213.1 dated Oct. 19, 2022, 22 pages.

* cited by examiner

CONFIGURABLE ANTENNA ARRANGEMENTS

CROSS-REFERENCE TO RELATED APPLICATIONS

This application claims priority to European Application No. 19164213.1, filed Mar. 21, 2019, the entire contents of which are incorporated herein by reference.

TECHNOLOGICAL FIELD

Embodiments of the present disclosure relate to configurable antenna arrangements.

BACKGROUND

Antenna arrangements comprise one or more antenna elements that are designed for transmission/reception of radio waves.

In some mobile cellular telephones, the antenna arrangement comprises multiple antenna elements that are spatially separated. The antenna arrangement is configurable. Switching from using one antenna element to using another antenna element can be used to avoid local interference and improve signal quality.

BRIEF SUMMARY

According to various, but not necessarily all, embodiments there is provided an apparatus comprising: a set of antenna elements; switching nodes; wherein each switching node has physical interconnects to a sub-set of the antenna elements for transferring communication signals and the switching nodes have physical interconnects to other switching nodes forming a network of switching nodes for transferring communication signals between switching nodes; and a control means for controlling operation of switching nodes to control use of the physical interconnects between switching nodes and control creation of different patterns of antenna elements operationally interconnected via multiple operationally interconnected switching nodes.

In some but not necessarily all examples, the control means is configured to control switching nodes to enable a communication path via one or more switching nodes from any antenna element to any other antenna element.

In some but not necessarily all examples, the control means is configured to control a shape of a spatial distribution pattern of antenna elements used, and/or control a number of antenna elements in a spatial distribution pattern of antenna elements used and/or control a sparsity of antenna elements in a spatial distribution pattern of antenna elements used.

In some but not necessarily all examples, the antenna elements are distributed spatially in a two-dimensional array in rows and columns.

In some but not necessarily all examples, the sub-set of antenna elements is the same arrangement of the same multiple antenna element for each switching node.

In some but not necessarily all examples, the network of switching nodes is an evenly distributed mesh network, wherein each switching node has physical interconnects only to its nearest neighbouring switching nodes.

In some but not necessarily all examples, the switching nodes are distributed spatially in a two-dimensional array in rows and columns.

In some but not necessarily all examples, the switching nodes are the same.

In some but not necessarily all examples, at least a first switching node is configured to perform any one or more of the following operations:
switching one input to the first switching node into one output from the first switching node by routing;
switching multiple inputs to the first switching node into one output from the first switching node by summing;
switching one input to the first switching node into many outputs from the first switching node;
terminating an input to the first switching node with an impedance.

In some but not necessarily all examples, at least a first switching node is configured to perform any one or more of the following operations:
controlling a phase shift for a transferred communication signal;
controlling amplitude of a transferred communication signal;
controlling frequency conversion of a transferred communication signal.

In some but not necessarily all examples, physical interconnects between switching nodes comprise first interconnects extending in a first direction and second interconnects extending in a second direction orthogonal to the first direction, wherein the switching nodes are configured to frequency divide communication signals transferred on the first interconnects from communication signals transferred on the second interconnects.

In some but not necessarily all examples, physical interconnects between switching nodes are bi-directional enabling bi-directional communication between adjacent switching nodes.

In some but not necessarily all examples, the switching nodes have multiple parallel physical interconnects to other switching nodes forming multiple parallel networks of switching nodes for transferring multiple parallel streams of communication signals between switching nodes, wherein at least two parallel streams are differentiated by one or more of:
different amplitude;
different steering direction;
different polarization;
different frequency.

In some but not necessarily all examples, the apparatus comprises:
at least one processor; and
at least one memory including computer program code
the at least one memory and the computer program code configured to, with the at least one processor, cause the apparatus at least to perform a function of the control means, including:
controlling operation of switching nodes to control use of the physical interconnects between switching nodes and to control creation of different patterns of antenna elements operationally interconnected via multiple operationally interconnected switching nodes, wherein said control is based on a target for at least one over-the air communication channel for transferred communication signals.

In some but not necessarily all examples, each switching node is provided by a distinct radio frequency integrated circuit comprising multiple antenna feeds to respective antenna elements of the sub-set of antenna elements and multiple mutually orthogonal ports for communication with other radio frequency integrated circuits providing switching nodes.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
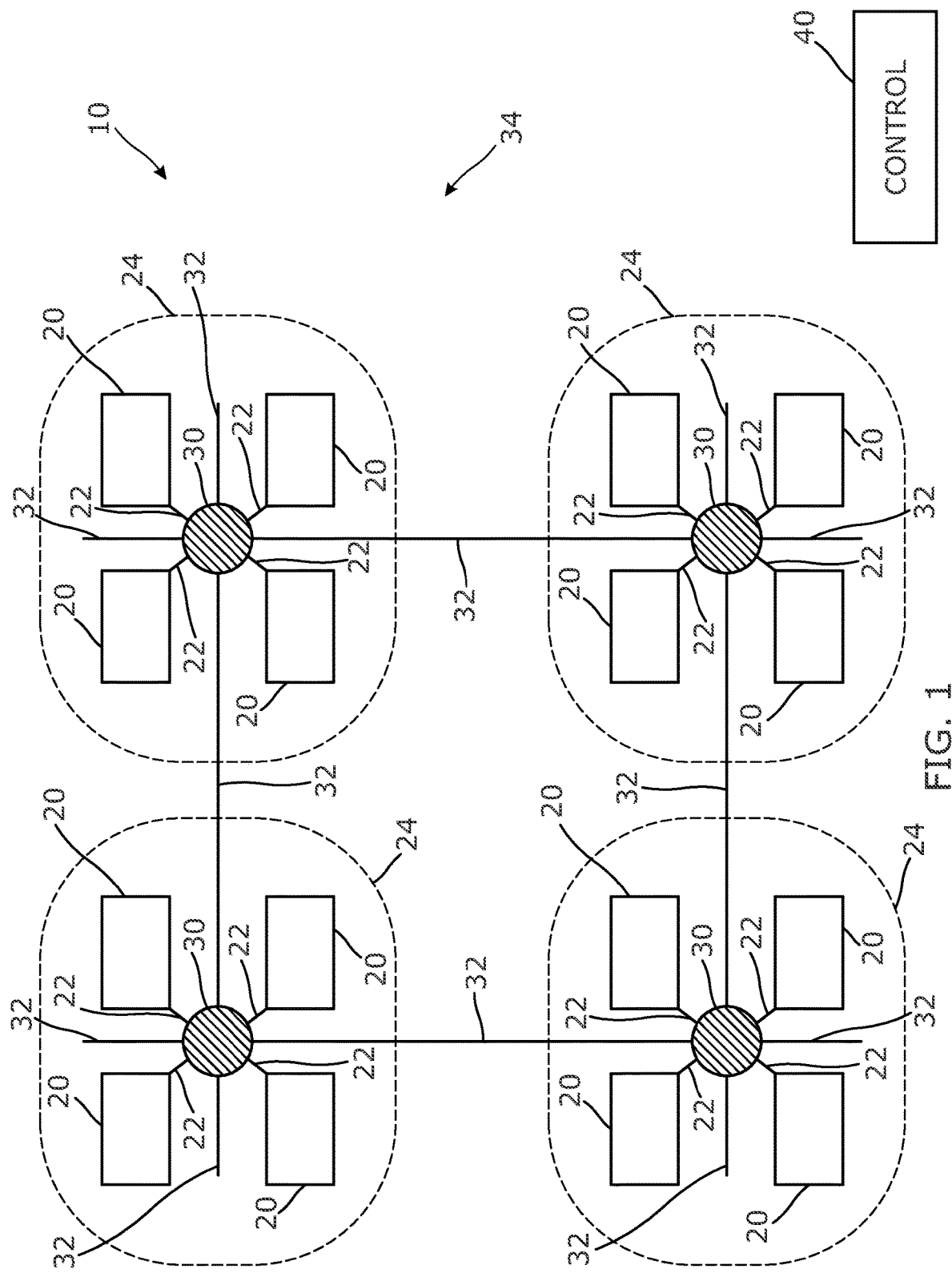
FIG. 1 shows an example embodiment of the subject matter described herein.

FIG. 1 illustrates an example of an apparatus 10 that can use different patterns of antenna elements 20 operationally interconnected via multiple operationally interconnected switching nodes 30.

The apparatus 10 comprises: a set of antenna elements 20; and switching nodes 30.

For some or all of the switching nodes 30, each switching node 30 has physical interconnects 22 to an associated sub-set 24 of the antenna elements 20 for transferring communication signals. In some examples, the communication signals are received by one or more antenna elements 20 of the sub-set 24 of antenna elements 20 and are transferred to the associated switching node 30. In these or different examples, the communication signals can be transferred from the associated switching node 30 and transmitted by one or more antenna elements 20 of the sub-set 24 of antenna elements 20.

The switching nodes 30 have physical interconnects 32 to other switching nodes 30. The physical interconnects 32 form a network 34 of switching nodes 30 for transferring communication signals between switching nodes 30.

A control means 40, for example a controller, is configured to control operation of the switching nodes 30 to control use of the physical interconnects 32 between switching nodes 30 and to control creation of different patterns of antenna elements 20 operationally interconnected via multiple operationally interconnected switching nodes 30.

The apparatus 10 has an adaptive configuration of antenna elements 20. In some, but not necessarily all, examples, the control means 40 is configured to control a shape of a spatial distribution pattern of the antenna elements 20 used. In some, but not necessarily all, examples, the control means 40 is configured to control a number of antenna elements 20 in a spatial distribution pattern of antenna elements 20 that are used. In some, but not necessarily all, examples, the control means 40 is configured to control a sparsity of antenna elements 20 used in a spatial distribution pattern of antenna elements 20.

In some, but not necessarily all, examples, the control means 40 is configured to control the operation of each switching node 30. Each switching node 30 can, for example, be controlled to use any one or more of its associated subset of antenna elements 20. In this way the control means 40 is able to control, individually, each antenna element 20 in the set of antenna elements 20.

In some, but not necessarily all, examples, the apparatus 10 is configured to route communication signals in a flexible manner. For example, the control means 40 can be configured to control switching nodes 30 to enable a communication path via one or more switching nodes 30 from any antenna element 20 to any other antenna element 20. The control means 40 can also be configured to control switching nodes 30 to enable a communication path from any switching node 30 to any other switching node 30.

In some, but not necessarily all, examples, the switching nodes 30 can also be configured to combine communication signals or split communication signals or terminate a communication signal.

The set of antenna elements 20 can comprise any number of antenna elements 20. However, it is expected that the apparatus 10 will have greatest utility when the number of antenna elements is greater than 36, for example greater than or equal to 64 antenna elements 20. In some examples, antenna elements 20 may have different electrical properties to each other for example support of different polarizations and different operational frequencies, which may be altered during the operation by the control means 40.

In some, but not necessarily all, examples, each switching node 30 has an associated subset 24 of antenna elements 20 that is the same arrangement of antenna elements 20. That is, each switching node 30 has a particular spatial distribution pattern of associated antenna elements and this pattern is repeated at each switching node 30. Thus each switching node 30 has the same number and spatial arrangement of antenna elements 20 in its associated subset 24.

Although in the example illustrated in FIG. 1 there are 4 antenna elements 20 associated with each switching node 30, this is not a requirement. There may be any number of antenna elements 20 in a subset 24.

The antenna element 20 of the subsets 24 of antenna elements 20 collectively form an arrangement of antenna elements 20 that has a particular arrangement or pattern. In some examples, the pattern is a regular pattern, however, in other examples the pattern may be irregular. In some examples, the pattern is a two-dimensional pattern, however, in other examples the pattern may be a three-dimensional pattern that may, for example, be arranged according to a Cartesian, spherical polar or cylindrical polar geometry.

Figure 2:
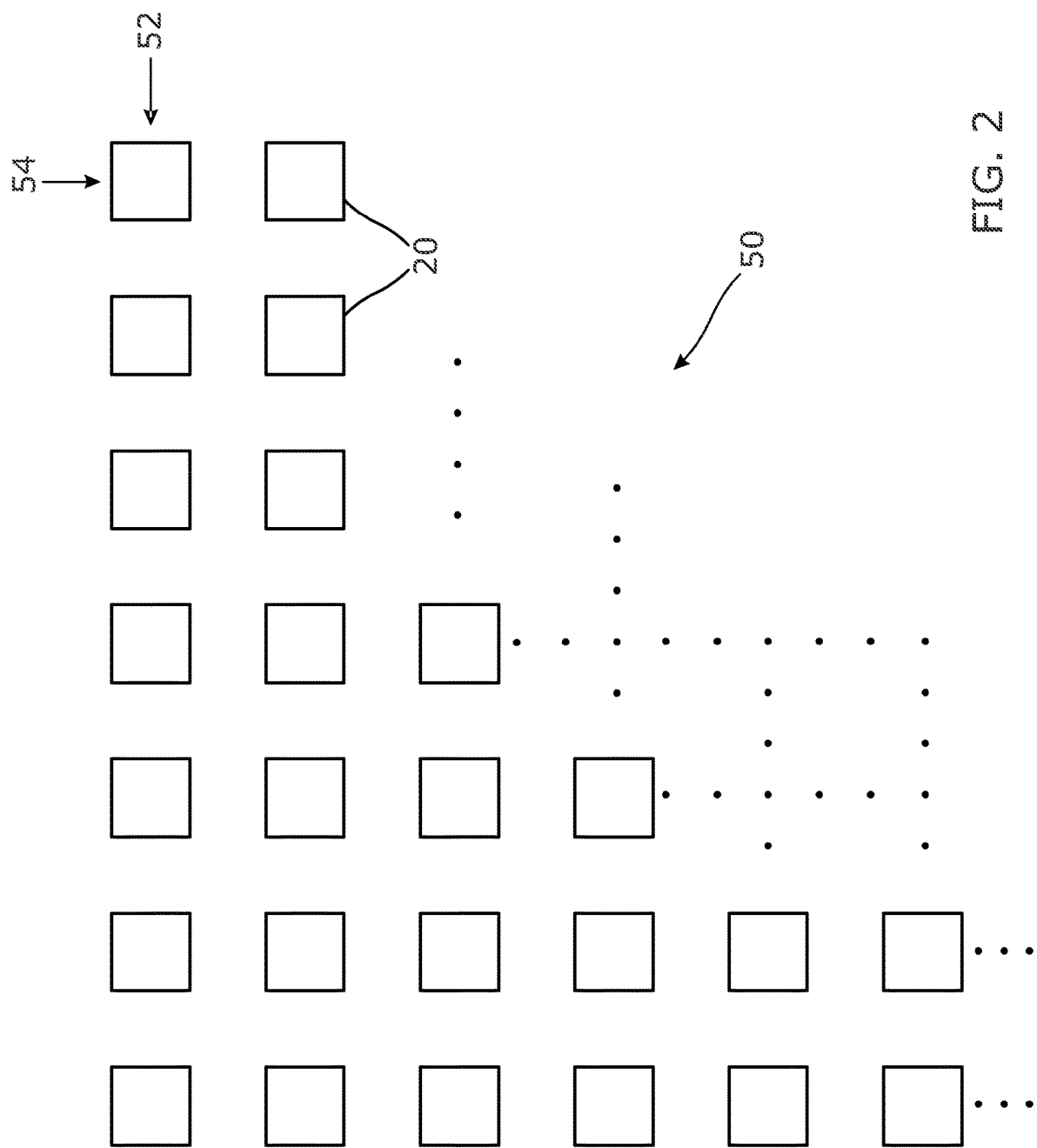
FIG. 2 shows another example embodiment of the subject matter described herein.

FIG. 2 illustrates one example of a set of antenna elements 20. In this example, the antenna elements 20 of the set are arranged in an array 50 that has rows 52 and columns 54. The array 50, in this example, is a two-dimensional flat planar array.

In addition, in this example, there is a common fixed spacing between rows 52 and there is also a common fixed spacing between columns 54. In some, but not necessarily all, examples, the common fixed spacing between the rows 52 and the common fixed spacing between the columns 54 is the same. However, in other examples the spacing of the rows 52 and the spacing of the columns 54 is different.

In some but not necessarily all examples, all of the antenna elements 20 of the set of antenna elements 20 in the array 50 are the same.

Figure 3:
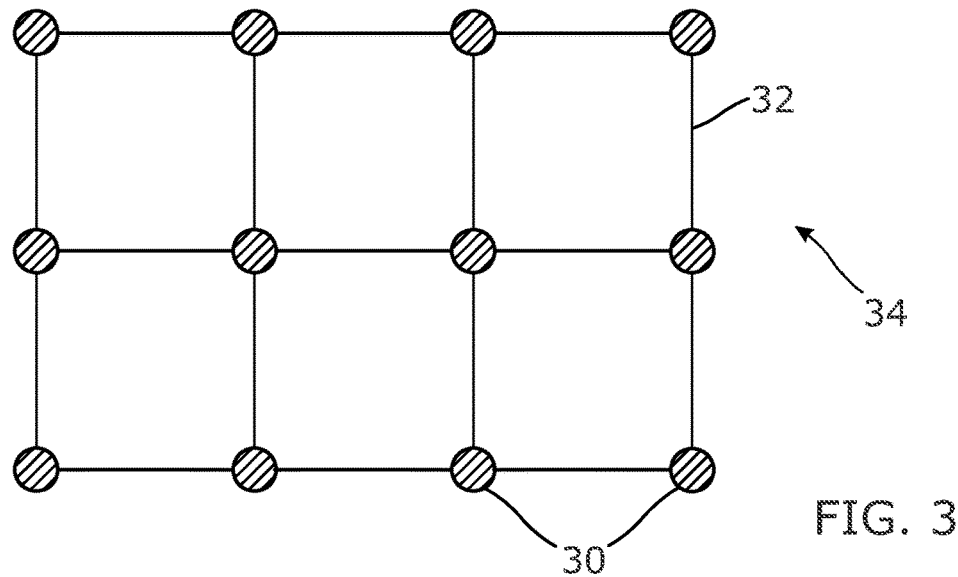
FIG. 3 shows an example embodiment of the subject matter described herein.

FIG. 3 illustrates an example of a network topology for the switching nodes 30. In this example, the network 34 of switching nodes 30 is a mesh network 34. Each switching node 30 has physical interconnects 32 only to its nearest neighbouring switching nodes 30.

In this example, but not necessarily all examples, the mesh network 34 is a two-dimensional network. Each switching node 30 has physical interconnects 32 only to its nearest neighbouring switching nodes 30 on a two-dimensional surface. This creates a grid or mesh.

In some examples, the antenna elements 20 lie within the same two-dimensional surface as the switching nodes 30. In other examples, some or all of the antenna elements 20 lie outside the two-dimensional surface shared by the switching nodes 30.

In some examples, the two-dimensional surface is a flexible two-dimensional surface that can be bent, curved, contorted etc.

In this example, but not necessarily all examples, the mesh network 34 is a flat two-dimensional network. Each switching node 30 has physical interconnects 32 only to its nearest neighbouring switching nodes 30 on a flat two-dimensional surface (a Cartesian plane).

In this example, but not necessarily all examples, the N nearest neighbour switching nodes 30 are arranged with maximum separation within the two-dimensional network 34. In this example N=4 resulting in a square grid network. In other examples N=6 resulting in a hexagonal grid network. Other values of N are possible.

In this example, the four nearest neighbour switching nodes 30 are arranged with maximum separation within the two-dimensional network 34. This results in a square grid network. Although in this example a square grid network 34 is described, that is formed from contiguous squares, in other examples the topology of the network may be formed from contiguous rectangles.

In the mesh network 34, the switching nodes 30 are distributed spatially in a two-dimensional array in rows 52 and columns 54. There is a common spacing between the rows 52 and a common spacing between the columns 54. The spacing between the rows 52 and the columns 54 can be the same or can be different.

In the example illustrated, but not necessarily all examples, the switching nodes 30 are the same.

In the example illustrated, but not necessarily all examples, there may be additional components associated with the switching nodes 30 for example frequency selective filters, local oscillators, low noise amplifiers and/or power amplifiers to perform and/or to enhance the operation of block 30.

FIGS. 4A to 4E illustrate an example of a switching node 30 and its controllable operation by control means 40. The switching node 30 is configured to be controlled by the control means to perform any one of a number of different operations.

The switching node 30 has one or more ports $110_1$ facing direction+D1, one or more ports $110_2$ facing direction+D2, one or more ports $110_3$ facing direction–D1 and one or more ports $110_4$ facing direction–D2. The direction+D1 is orthogonal to direction+D2 and –D2 and direction–D1 is orthogonal to direction+D2 and –D2.

Figure 4A:
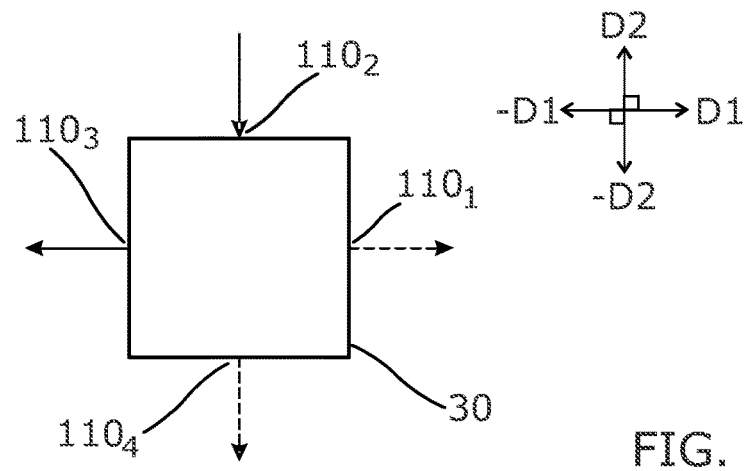
FIG. 4A, 4B, 4C, 4D, 4E shows another example embodiment of the subject matter described herein.

For example, as illustrated in FIG. 4A, the switching node 30 is configured to enable switching of one input to the switching node 30 to one output from the switching node 30 by routing. In the example illustrated, the switching node 30 is configured to switch one communication signal input to the switching node 30 at one port $110_i$ into an output from any one of the four ports $110_1$, $110_2$, $110_3$, $110_4$ by routing.

Figure 4B:
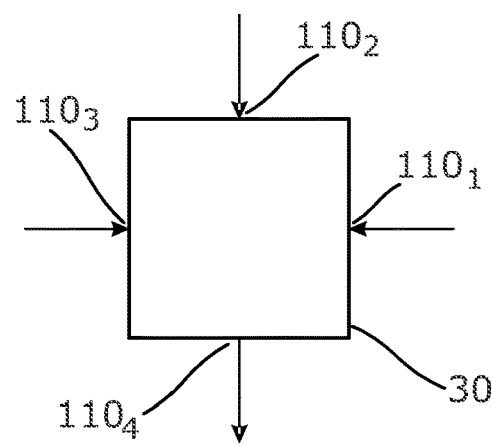

In the example illustrated in FIG. 4B, the switching node 30 is configured to switch multiple inputs into the switching node 30 into one output from the switching node 30 by summing. The summed communication signal can be provided as an output from any one of the four ports $110_1$, $110_2$, $110_3$, $110_4$.

Figure 4C:
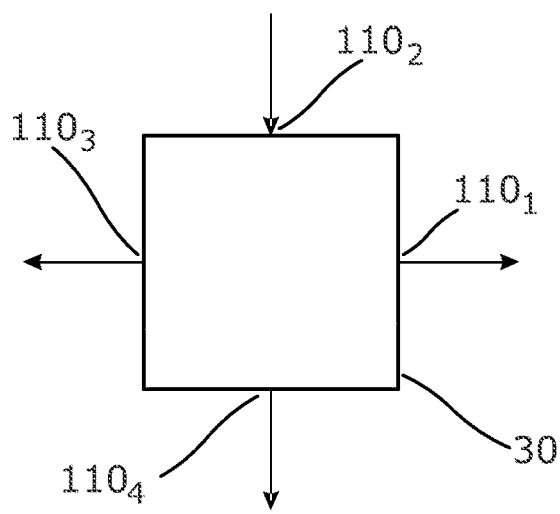

In the example illustrated in FIG. 4C, the switching node 30 is configured to switch one input to the switching node 30 into many outputs from the switching node 30. The output communication signal can be provided as an output from any one of the four ports $110_1$, $110_2$, $110_3$, $110_4$.

Figure 4D:
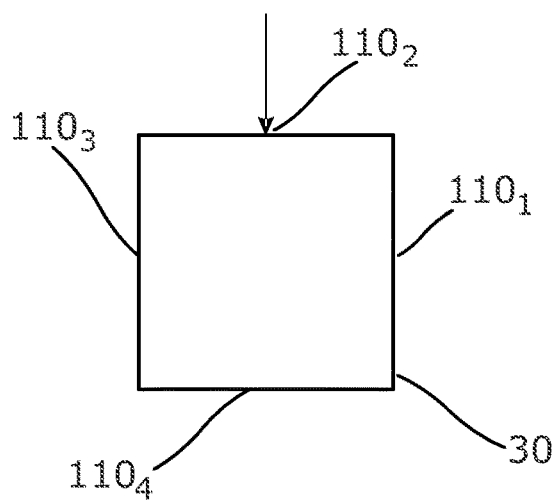
Figure 4E:
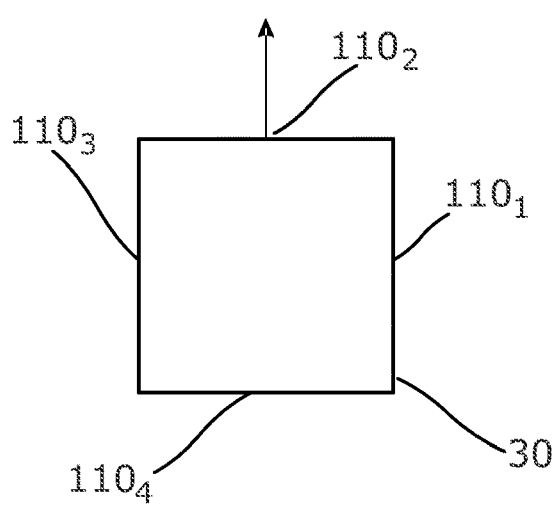

As illustrated in the examples of FIG. 4D, the switching node 30 is configured to terminate an input into the switching node 30. In some examples, the input at a port $110_i$ is terminated at an impedance. In some examples, the input at a port $110_i$ is terminated to a base band circuit, comprising for example an analogue to digital converter (ADC). It operates as a sink of a communication signal In the example illustrated in FIG. 4E, the switching node 30 is configured to provide an output from the switching node 30 from a base band circuit for example a digital to analogue converter (DAC). It operates as a source of a communication signal.

The switching node 30, in some but not necessarily all examples, is additionally configured to perform one or more additional operations.

Figure 5A:
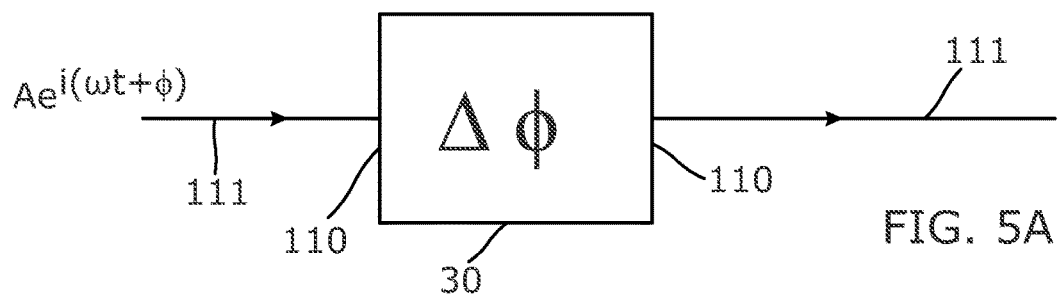
FIG. 5A, 5B, 5C, 5D show example embodiments of the subject matter described herein.

For example, as illustrated in FIG. 5A, the switching node 30 is configured to control a phase shift for a transferred communication signal 111. The phase shift can be provided to a communication signal 111 received as an input at a port 110. The phase shift can be provided to a communication signal before being transmitted as an output from a port 110.

Figure 5B:
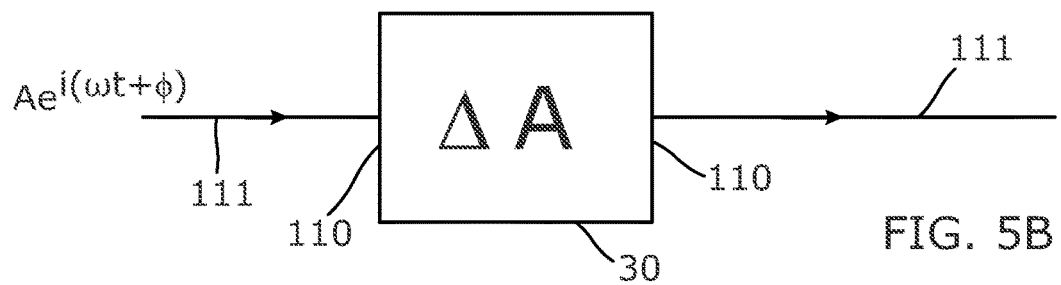

For example, as illustrated in FIG. 5B, the switching node 30 is additionally or alternatively configured to control an amplitude of a transferred communication signal 111 by controlling the gain of switching node 30. The gain control can be provided to a communication signal 111 received as an input at a port 110. The gain control can be provided to a communication signal 111 before being transmitted as an output from a port 110.

Figure 5C:
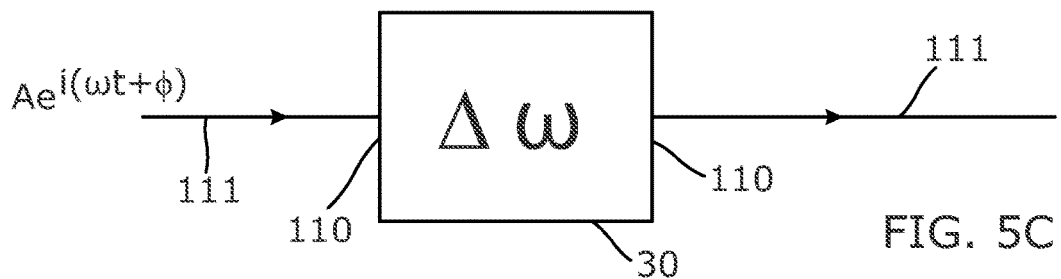

For example, as illustrated in FIG. 5C, the switching node 30 is additionally or alternatively configured to control a frequency of a transferred communication signal 111 by applying a frequency conversion, a frequency modulation or an I/Q signal separation. The frequency control can be provided to a communication signal 111 received as an input at a port 110. The frequency control can be provided to a communication signal 111 before being transmitted as an output from a port 110.

Figure 5D:
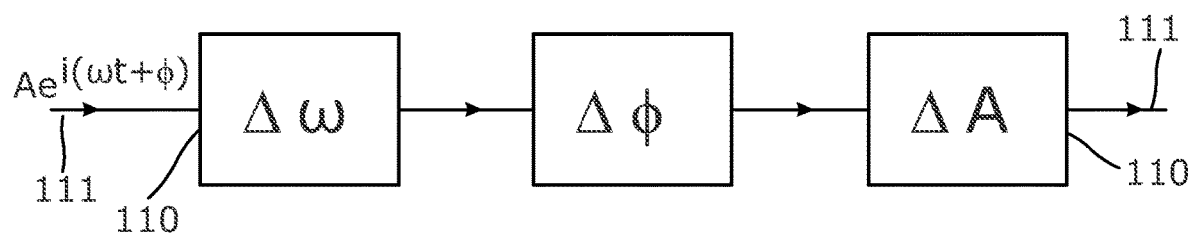

As illustrated in FIG. 5D, under control of the control means 40, the switching node 30 is configured to control all, some, one or none of: phase shift, amplitude, and frequency of the communication signal 111.

It will therefore be understood from the foregoing that the communication between switching nodes 30 can be in the analogue domain prior to analogue to digital conversion or after digital to analogue conversion. The switching nodes 30 can provide an interface to base band circuitry to which an analogue communication signal 111 is provided for conversion to a digital communication signal by analogue to digital conversion circuitry and/or an interface to base band circuitry from which an analogue communication signal 111 is received from digital to analogue conversion circuitry.

In some, but not necessarily all, examples, it may be desirable to have a calibration operation for the switching nodes 30. The calibration operation can be used to ensure that a phase change across each of the switching nodes 30 is the same. Calibration can, for example, be performed by sending signals on different routes through the network 34 and then measuring the phase difference between the routes.

Figure 6:
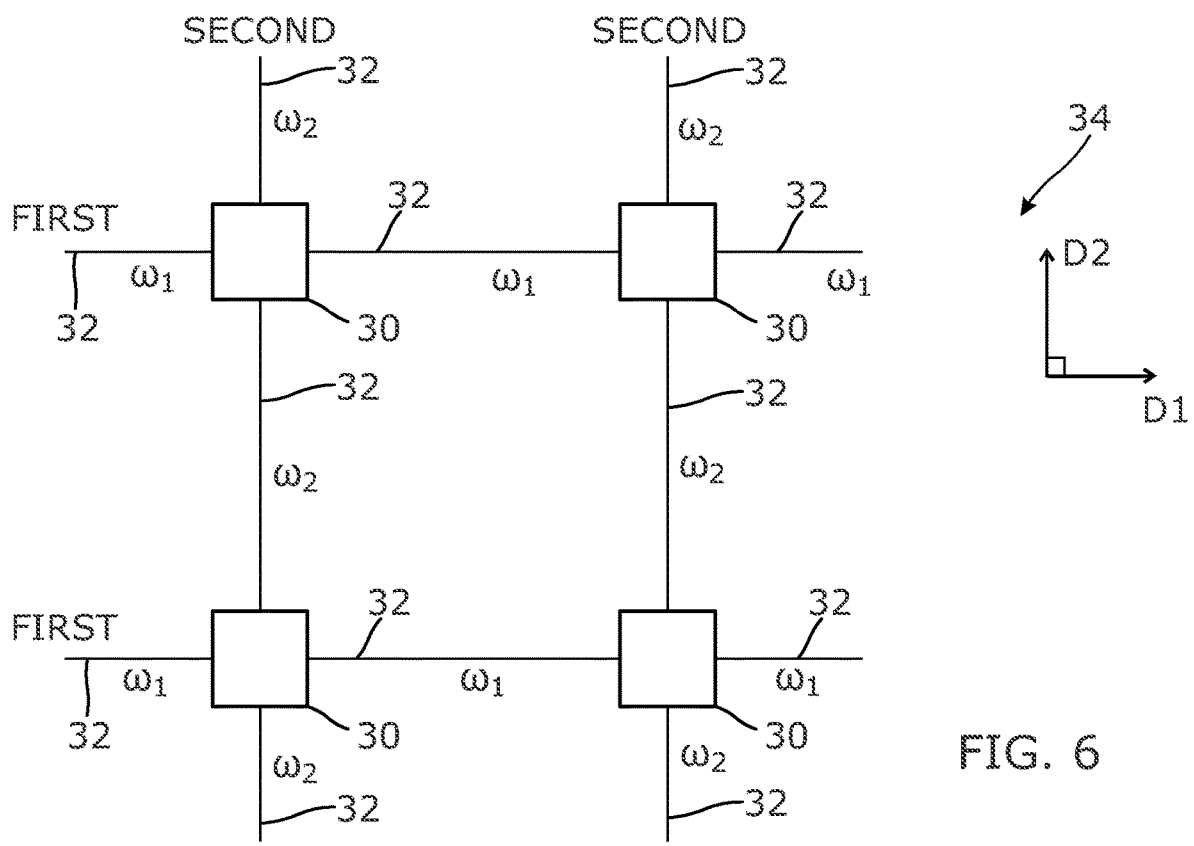
FIG. 6 shows another example embodiment of the subject matter described herein.

FIG. 6 illustrates a portion of a mesh network 34 of switching nodes 30. The physical interconnect 32 between the switching nodes 30 comprises first interconnects 32 extending in a first direction+/−D1 and second interconnects 32 extending in a second direction+/−D2 orthogonal to the first direction. The switching nodes 30 are configured to frequency divide communication signals transferred on the first interconnects 32 from communication signals transferred on the second interconnects 32. Consequently, the frequency of the communication signals on the first interconnects (horizontal) is different to the frequency of the communication signals on the second interconnects (vertical).

In the preceding examples, reference has been made to an interconnect 32 between switching nodes 30. In some examples, this is a single bidirectional interconnect. In other examples it may be a unidirectional interconnect or in still further examples it may be a pair of unidirectional interconnects that together form a bidirectional interconnect. It will therefore be appreciated that in some, but not necessarily all, examples, the switching nodes 30 are in bidirectional communication with adjacent switching nodes 30 in the network 34.

Figure 7:
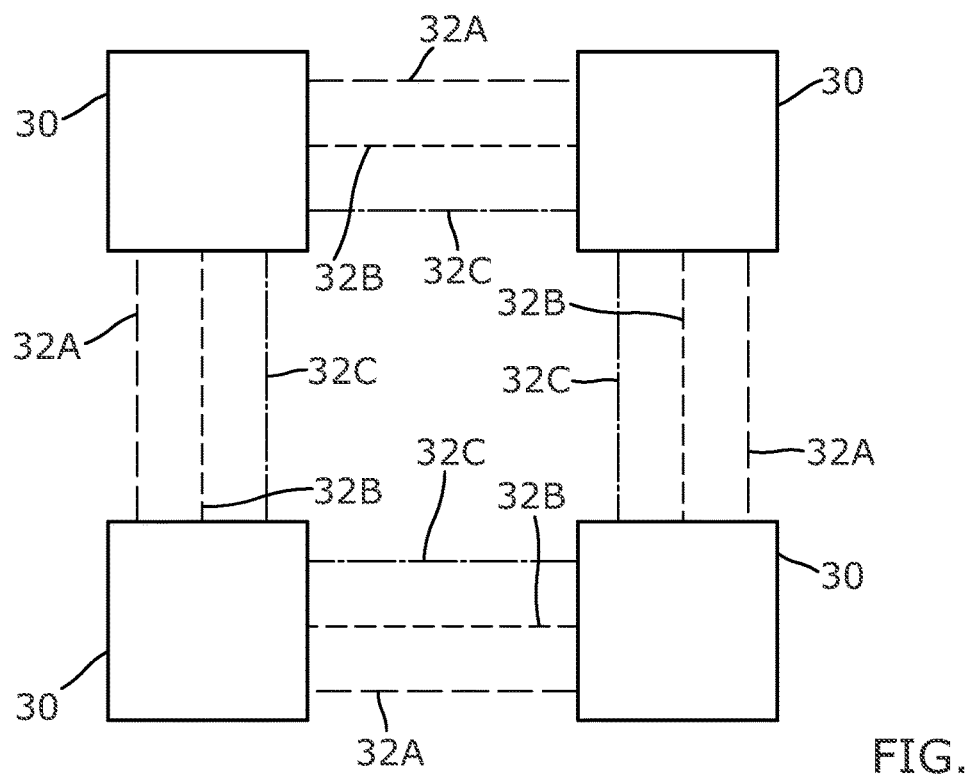
FIG. 7, 8A, 8B, 8C shows an example embodiment of the subject matter described herein.

FIG. 7 illustrates a portion of a mesh network 34 comprising multiple switching nodes 30. In this example, the switching nodes 30 have multiple parallel physical interconnects 32A, 32B, 32C to other switching nodes 30 forming multiple parallel networks 34 of switching nodes 30 for transferring multiple parallel streams of communication signals between the switching nodes 30. The different multiple parallel networks 34 are illustrated in FIGS. 8A, 8B and 8C.

The parallel streams of communication signals between the switching nodes 30 are differentiated by one or more of: different gain, different steering direction, different polarization and different frequency.

Figure 8A:
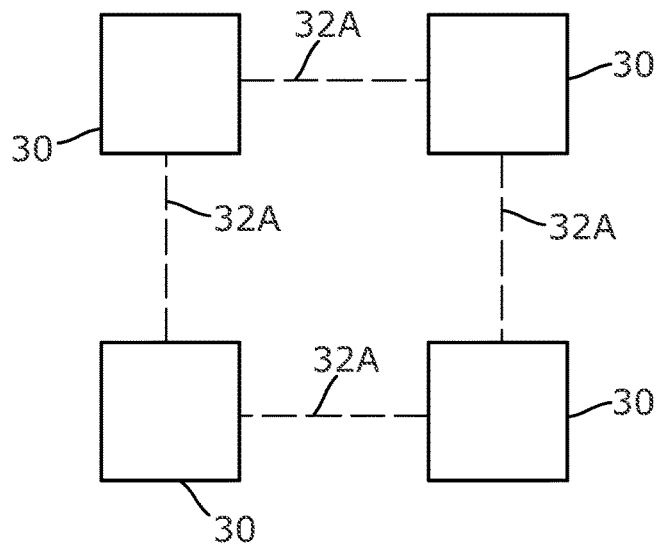
Figure 8B:
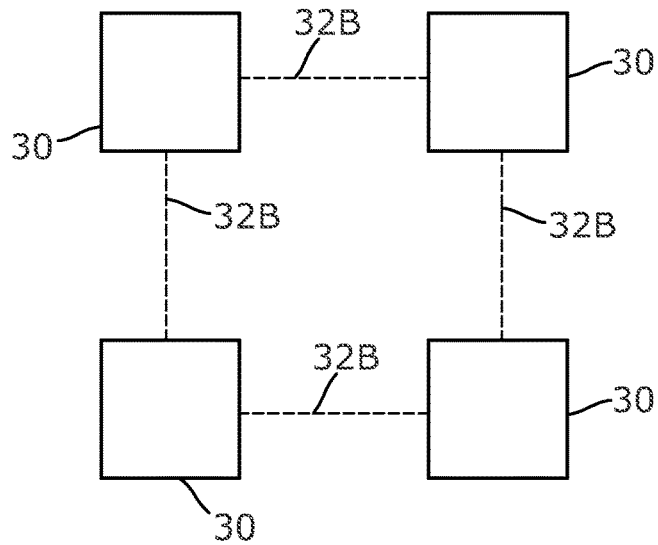
Figure 8C:
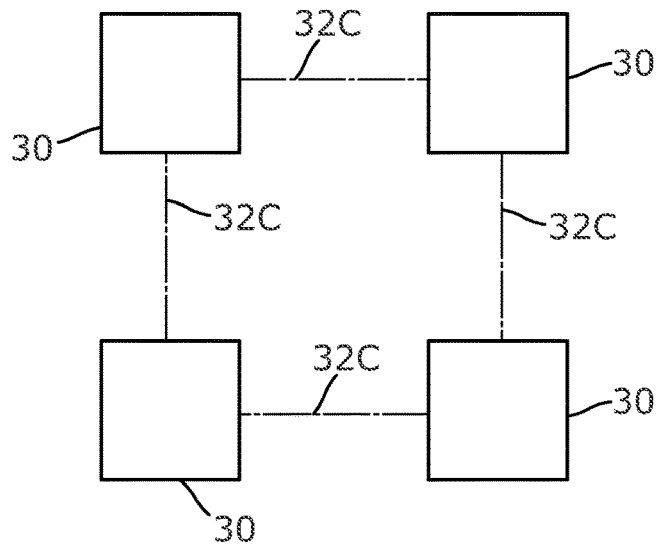

Thus the different networks illustrated in FIGS. 8A, B, C can have different gain, different steering directions, different polarizations, different power levels and/or different frequencies.

Figure 9A:
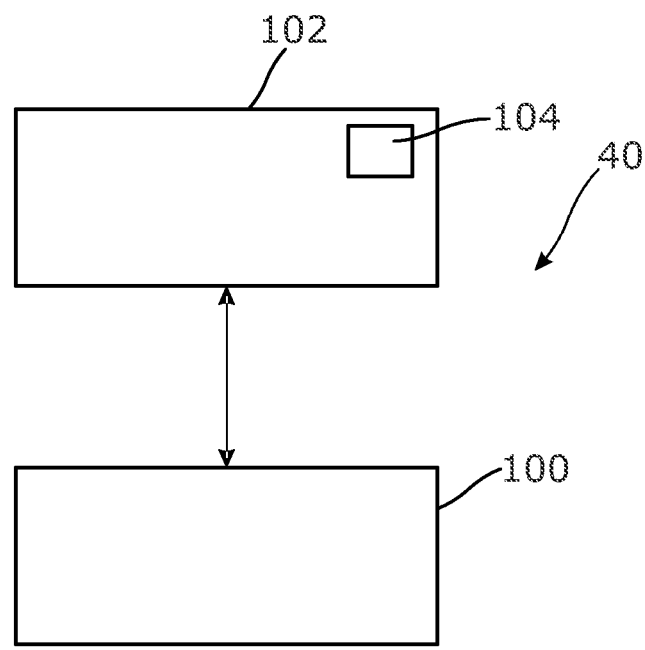
FIG. 9A shows an example embodiment of the subject matter described herein.

FIG. 9A illustrates an example of a controller 40. Implementation of a controller 40 may be as controller circuitry. The controller 40 may be implemented in hardware alone, have certain aspects in software including firmware alone or can be a combination of hardware and software (including firmware).

As illustrated in FIG. 9A the controller 40 may be implemented using instructions that enable hardware functionality, for example, by using executable instructions of a computer program 104 in a general-purpose or special-purpose processor 100 that may be stored on a computer readable storage medium (disk, memory etc) to be executed by such a processor 100.

The processor 100 is configured to read from and write to the memory 102. The processor 100 may also comprise an output interface via which data and/or commands are output by the processor 100 and an input interface via which data and/or commands are input to the processor 100.

The memory 102 stores a computer program 104 comprising computer program instructions (computer program code) that controls the operation of the apparatus 10 when loaded into the processor 100. The computer program instructions, of the computer program 104, provide the logic and routines that enables the apparatus 10 to perform the methods described. The processor 100 by reading the memory 102 is able to load and execute the computer program 104.

The apparatus 10 therefore comprises:

at least one processor 100; and at least one memory 102 including computer program code the at least one memory 102 and the computer program code configured to, with the at least one processor 100, cause the apparatus 10 at least to perform:

controlling operation of switching nodes 30 to control use of physical interconnects 32 between switching nodes 30 and control creation of different patterns of antenna elements 20 operationally interconnected via multiple operationally interconnected switching nodes 30, wherein said control is based on a target for at least one over-the air communication channel for transferred communication signals.

Figure 9B:
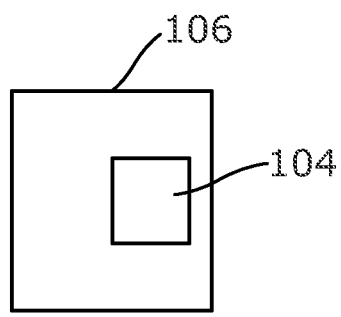
FIG. 9B shows another example embodiment of the subject matter described herein.

As illustrated in FIG. 9B, the computer program 104 may arrive at the apparatus 10 via any suitable delivery mechanism 106. The delivery mechanism 106 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 104. The delivery mechanism 106 may be a signal configured to reliably transfer the computer program 104. The apparatus 10 may propagate or transmit the computer program 104 as a computer data signal.

Computer program instructions for causing an apparatus 10 to perform at least the following or for performing at least the following:

controlling operation of switching nodes 30 to control use of physical interconnects 32 between switching nodes 30 and control creation of different patterns of antenna elements 20 operationally interconnected via multiple operationally interconnected switching nodes 30, wherein said control is based on a target for at least one over-the air communication channel for transferred communication signals.

The computer program instructions may be comprised in a computer program, a non-transitory computer readable medium, a computer program product, a machine readable medium. In some but not necessarily all examples, the computer program instructions may be distributed over more than one computer program.

Although the memory 102 is illustrated as a single component/circuitry it may be implemented as one or more separate components/circuitry some or all of which may be integrated/removable and/or may provide permanent/semi-permanent/dynamic/cached storage.

Although the processor 100 is illustrated as a single component/circuitry it may be implemented as one or more separate components/circuitry some or all of which may be integrated/removable. The processor 100 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The controller 40 can be part of the digital base band circuitry previously described. The digital base band circuitry can be separated from one or more switching nodes 30 by an analogue to digital converter and/or a digital to analogue converter. The digital base band circuitry is configured to provide digital communication signals which are converted to analogue communication signals. The analogue communication signals are provided to one or more switching nodes 30. The switching nodes 30 provide analogue communication signals to analogue to digital converters in the base band circuitry, which convert the analogue communication signals to digital communication signals for further processing.

The control of the switching nodes 30 by the controller 40 can be achieved using either analogue or digital control signals. The control signal is generated by the computer program 104 running on the processor 100.

Consequently, the apparatus 10 comprises at least one processor 100; and at least one memory 102 comprising computer program code 104, the at least one memory 102 and the computer program code 104 configured to, with the at least one processor 100, cause the apparatus 10 at least to perform the function of the controller 40 comprising:

controlling operation of switching nodes 30 to control use of physical interconnects 32 between switching nodes 30 and to control creation of different patterns of antenna elements operationally interconnected via multiple operationally interconnected switching nodes 30.

In at least some but not necessarily all embodiments, the control is based on a target for at least one over the air communication channel for transfer communication signals. The transfer communication signals are either transmitted or received via one or more antenna elements 20.

The purpose of the target is to improve quality. For example, to reduce noise or interference or to improve signal quality of the communication signal either in transmission and/or reception.

The controller 40 is configured to determine which antenna elements 20/switching nodes 30/communication signal streams are to be used based on at least one of the following quality parameters:

signal-to-noise ratio of the received signal,
signal-to-noise ratio of the transmitted signal,
signal-to-interference ratio of received signal,
direction of arrival of interference,
restricted direction of transmission,
wanted antenna radiation pattern,
location of the users of communication beams,
signal level of received communication signal,
signal level of transmitted communication signal,
needed quality level of the transmission/reception or
needed amount of antenna gain applied to received/transmitted signal.

Figure 10:
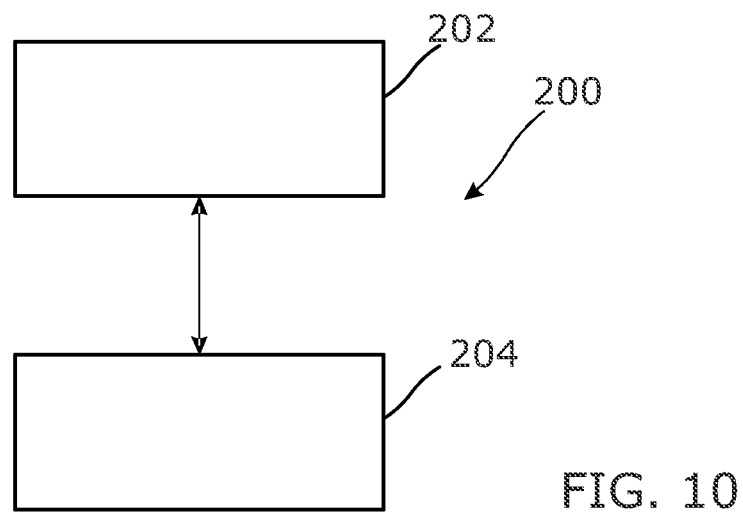
FIG. 10 shows an example embodiment of the subject matter described herein.

FIG. 10 illustrates an example of a method 200 that can be performed by the apparatus 10, for example by the controller 40.

At block 202, the method 200 comprises: controlling operation of switching nodes 30 to control use of physical interconnects 32 between switching nodes 30 and control creation of different patterns of antenna elements 20 operationally interconnected via multiple operationally interconnected switching nodes 30, wherein each switching node 30 has physical interconnects 22 to a sub-set 24 of the antenna elements 20 for transferring communication signals and the switching nodes 30 have physical interconnects 32 to other switching nodes 30 forming a network 34 of switching nodes 30 for transferring communication signals between switching nodes 30.

At block 204, the method 200 comprises: transferring communication signals via the network 34 of switching nodes 30 for transferring communication signals.

It will be appreciated from the foregoing that the apparatus 10 is extremely flexible. There are a number of design/operation parameters that allow the apparatus 10 to operate with different functionalities. The design/operation parameters include the number and/or arrangement of antenna elements 20 in use per switching node 30, the number and/or arrangement of switching nodes 30 in use, the number and/or type of streams of communication signals in use, and/or the extent to which the antenna elements 20, switching nodes 30 and streams are or are not shared in use.

Figure 11A:
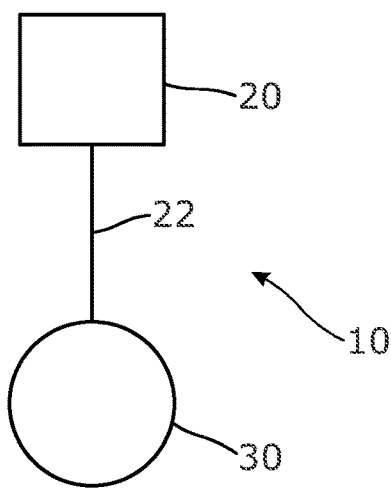
FIG. 11A, 11B, 11C show example embodiments of the subject matter described herein.
Figure 11B:
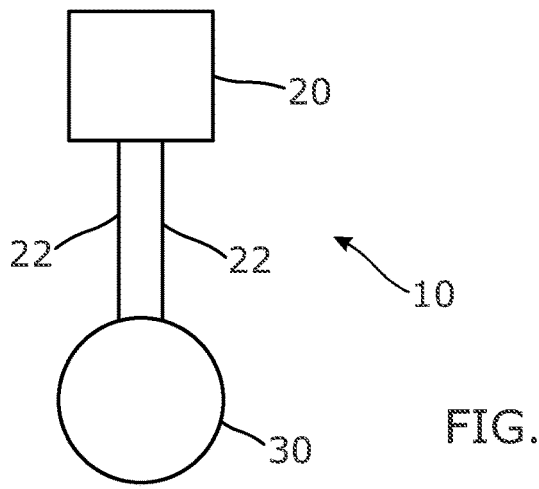
Figure 11C:
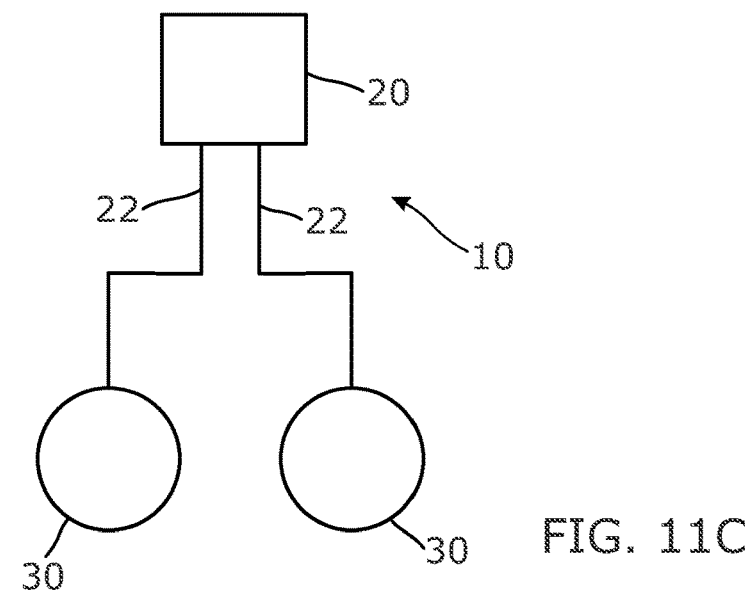

FIGS. 11A, 11B and 11C illustrate different examples of operational configurations of the apparatus 10. In some examples, these configurations may be designed into the hardware of the apparatus 10. In other examples they may be software-enabled configurations that are controlled via the controller 40 controlling the operation of the switching nodes 30.

In the example illustrated in FIG. 11A, a single antenna element 20 provides a single stream of communication signals to a single switching node 30. In the example of FIG. 11B, the single antenna can provide different weighted streams to a single switching node 30. In the example of FIG. 11C, a single antenna element 20 is shared between multiple switching nodes 30. In this example, the same or different streams of communication signals may be shared between the different switching nodes 30.

Figure 12A:
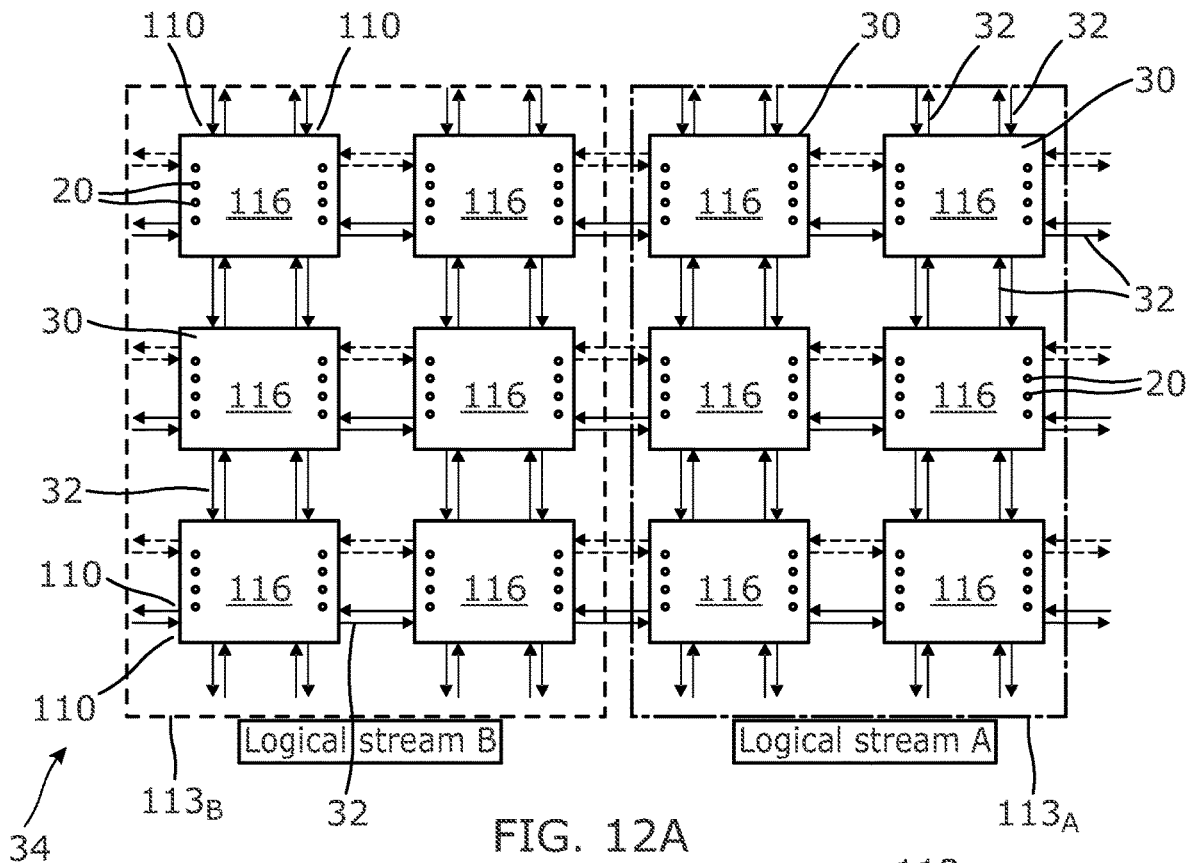
FIG. 12A, 12B show another example embodiment of the subject matter described herein.
Figure 12B:
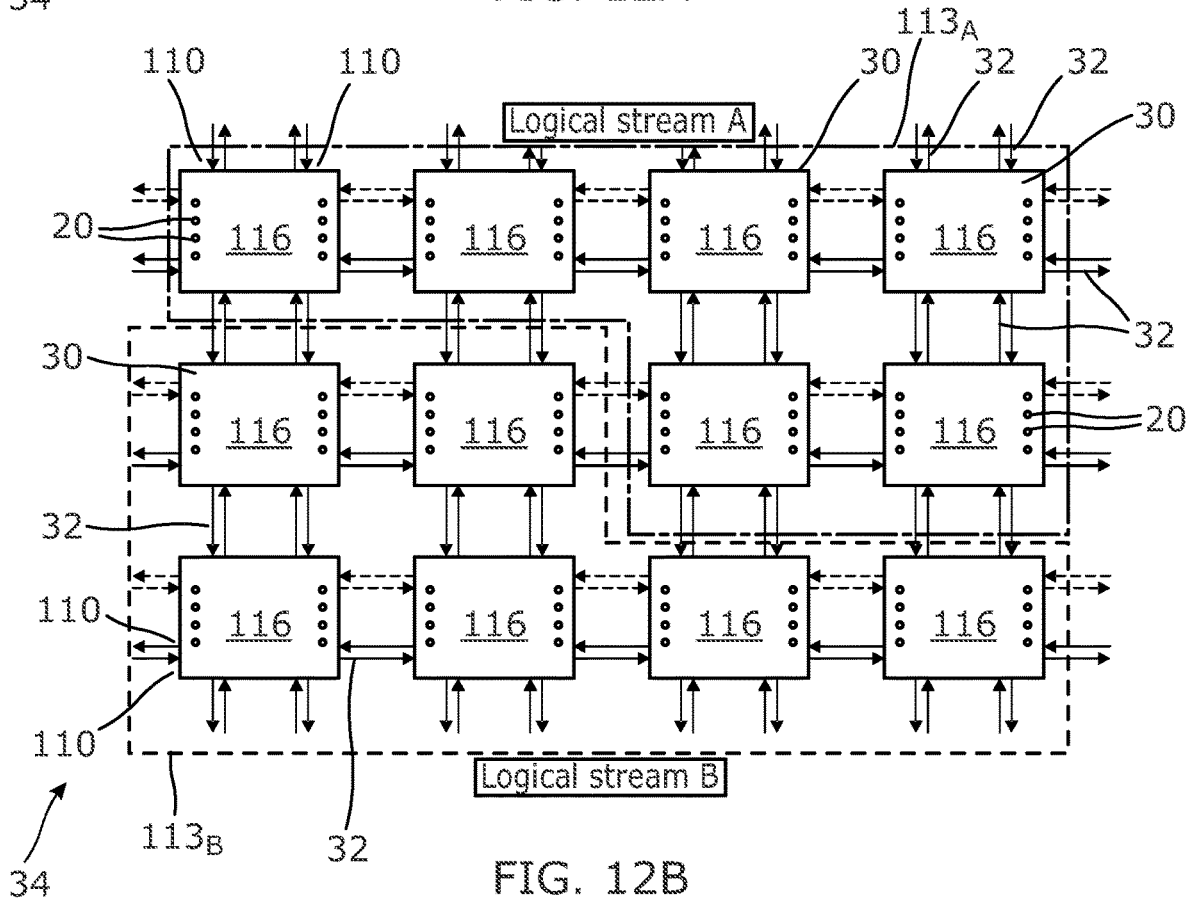

In the examples of FIGS. 12A and 12B antenna elements 20 are not shared and switching nodes are not shared. The communication streams (A, B) are separate and distinct. Different, distinct groups 113A, 113B of switching nodes 30 are used for the different, respective streams A, Bin effect forming different networks for different streams.

The 3 row by 4 column network 34 of switching nodes, has the switching nodes 30 assigned to streams A, B according to the following patterns in FIG. 12A:

| B | B | A | A |
| B | B | A | A |
| B | B | A | A |

The 3 row by 4 column network 34 of switching nodes, has the switching nodes 30 assigned to streams A, B according to the following patterns in FIG. 12B:

| A | A | A | A |
| B | B | A | A |
| B | B | B | B |

Comparing FIGS. 12A and 12B, it can be seen that the control means 40 is configured to control operation of the switching nodes 30 to control use of the physical interconnects 32 between switching nodes 30 and to control creation of different patterns of antenna elements 20 operationally interconnected via multiple operationally interconnected switching nodes 30. In this example, the control means 40 controls a shape of a spatial distribution pattern of antenna elements 20 used. In FIG. 12A, each stream uses a rectangle of switching nodes 30 and associated antenna elements 20, whereas in FIG. 12B, each stream uses an L-shaped pattern of switching nodes 30 and associated antenna elements 20.

The switching nodes 30 are assigned to streams A, B according to the following different patterns in FIG. 12B:

| B | B |   |   | & | A | A | A | A |
| B | B | B | B |   |   |   | A | A |

In this example, the number of antenna elements 20 and switching nodes remains the same however in other examples the number of switching nodes used and/or antenna elements 20 used may be varied.

Figure 13A:
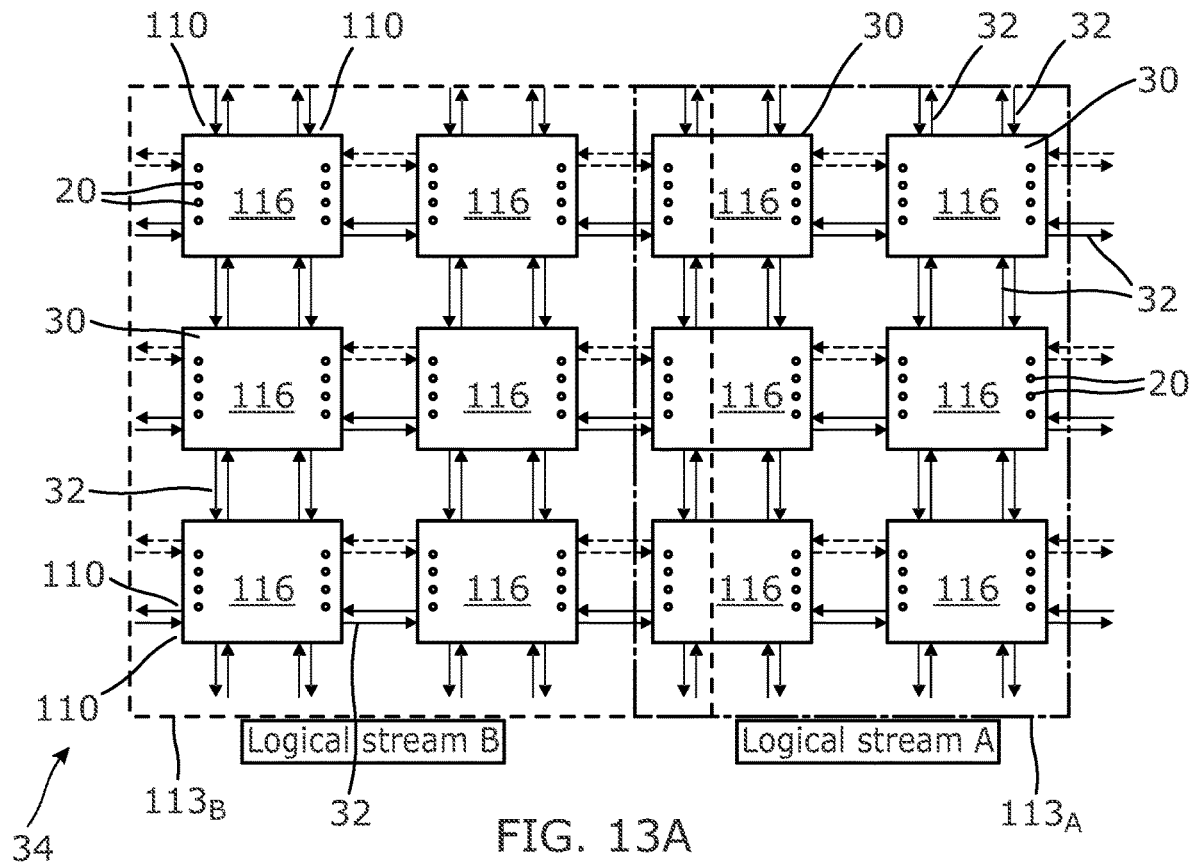
FIG. 13A, 13B show another example embodiment of the subject matter described herein.
Figure 13B:
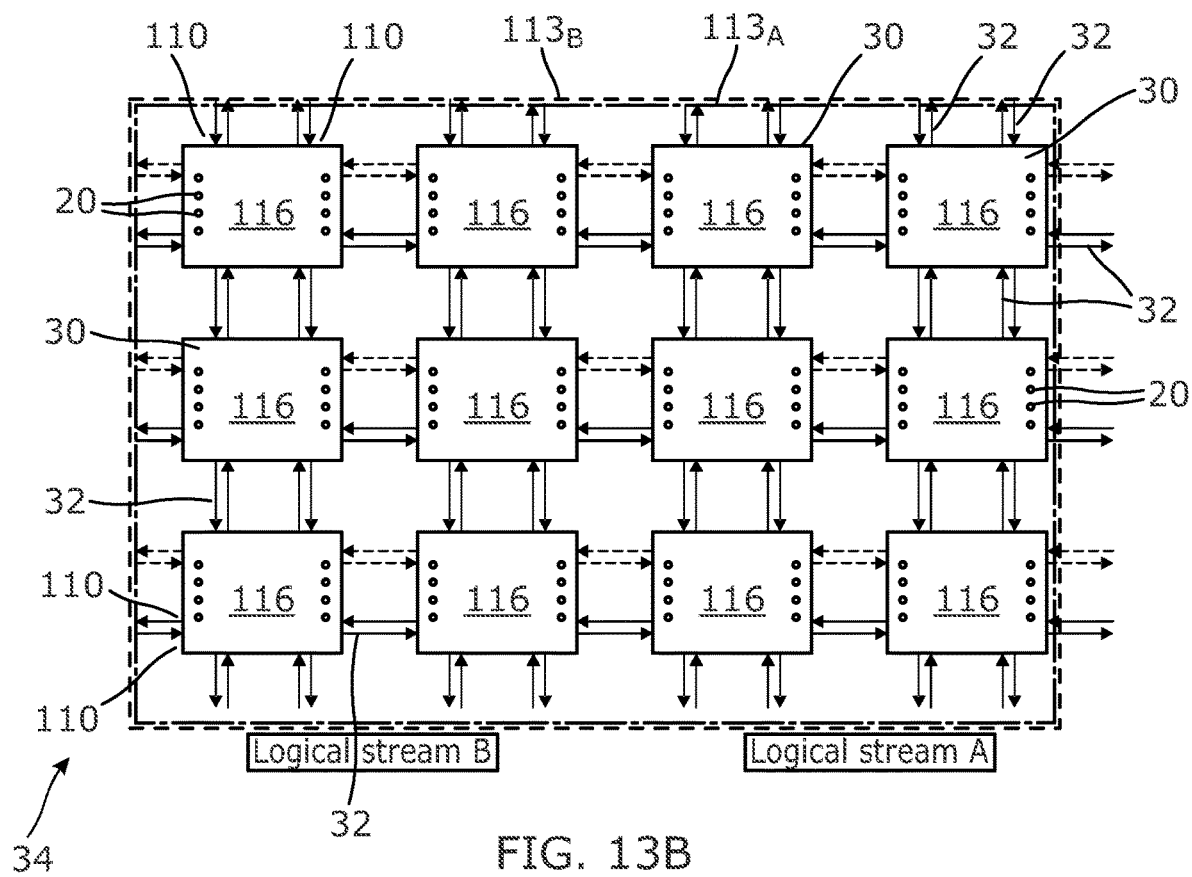

In the examples of FIGS. 13A and 13B antenna elements 20 are not shared and at least some switching nodes 30 are shared. The communication streams are separate and distinct. Different groups 113A, 113B of switching nodes 30 are used for the different, respective streams A, B in effect forming different networks for different streams.

The 3 row by 4 column network 34 of switching nodes, has the switching nodes 30 assigned to streams A, B according to the following patterns in FIG. 12A:

| B | B | B/A | A |
| B | B | B/A | A |
| B | B | B/A | A |

The 3 row by 4 column network 34 of switching nodes, has the switching nodes 30 assigned to streams A, B according to the following patterns in FIG. 12B:

| A/B | A/B | A/B | A/B |
| A/B | A/B | A/B | A/B |
| A/B | A/B | A/B | A/B |

Comparing FIGS. 13A and 13B, it can be seen that the control means 40 is configured to control operation of the switching nodes 30 to control use of the physical interconnects 32 between switching nodes 30 and to control creation of different patterns of antenna elements 20 operationally interconnected via multiple operationally interconnected switching nodes 30. In this example, the control means 40 controls a shape of a spatial distribution pattern of antenna elements 20 used. In FIG. 13A, each stream uses a rectangle of switching nodes 30 and associated antenna elements 20. The rectangles partially overlap and the switching nodes 30 in the overlap are shared but antenna elements 20 are not shared. In FIG. 13B, each stream uses a rectangle of switching nodes 30 and associated antenna elements 20. The rectangles completely overlap and the switching nodes 30 in the overlap are shared but antenna elements 20 are not shared. The size and shape of the arrangement of antenna elements 20 used changes from FIG. 13A to FIG. 13B. The number of switching nodes 30 used per stream increase from FIG. 13A to 13B.

It will be appreciated from FIGS. 12A, 12B, 13A and 13B that the controller 40 is configured to use distinct groups of antenna elements 20 for different streams. The shape or pattern of the group of antenna elements 20 used can be varied. In the examples of FIGS. 12A and 12B, distinct groups 113 of switching nodes 30 are used for different streams. In FIG. 12B, the controller 40 changes a shape of the group of antenna elements 20 but keeps the switching nodes 30 distinct with respect to different streams. In FIG. 13A, the controller 40 keeps the antenna elements 20 distinct and unshared but enables at least some of the switching nodes 30 to be shared between different streams. In FIG. 13B, the controller 40 enables the shape or pattern of antenna elements to be changed while keeping the antenna elements 20 distinct with respect to different streams but allowing sharing of switching nodes 30 for different streams.

Figure 14A:
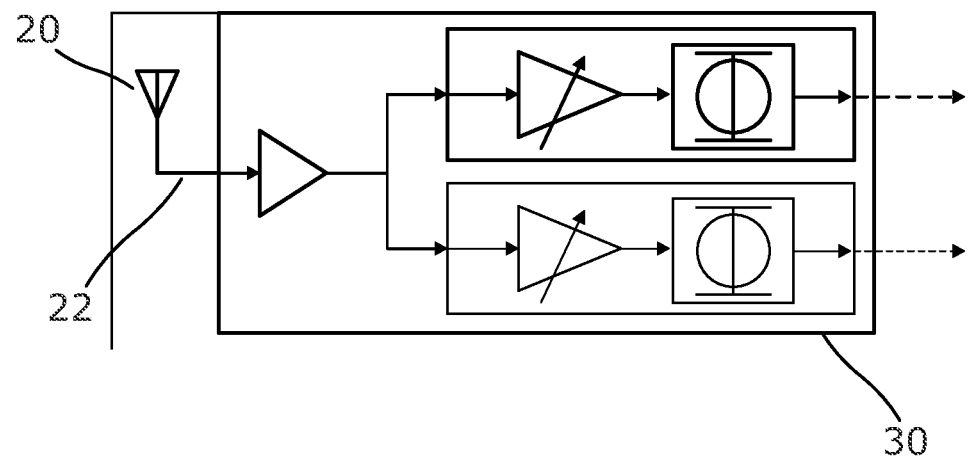
FIG. 14A, 14B show another example embodiment of the subject matter described herein.
Figure 14B:
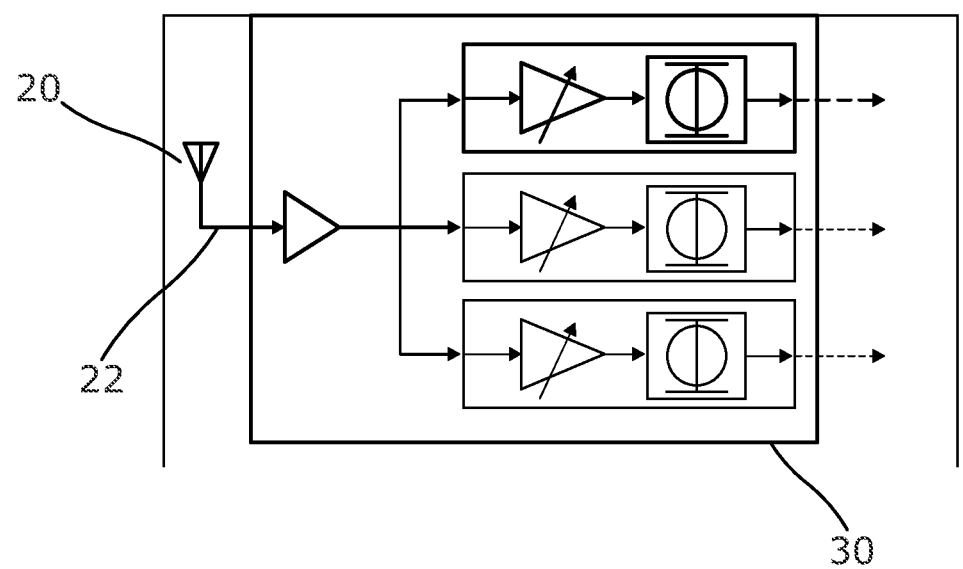

In the examples illustrated in FIGS. 14A and 14B, an antenna element 20 is shared. In the example of FIG. 14A, a single antenna element 20 provides two distinct streams of communication signals to a switching node 30. These distinct streams can be separately amplified, or otherwise modified as previously described. The different streams could, for example, be for different polarizations or different frequencies. In the example of FIG. 14B, a single antenna element 20 provides three distinct streams of communication signals to a switching node 30. These distinct streams can be separately amplified, or otherwise modified as previously described.

In some examples, the distinct streams from an antenna element 20 are provided to a single switching node 30, for example as illustrated in FIG. 11B. However, in other examples the same or different streams may be provided to different switching nodes 30, for example as illustrated in FIG. 11C. It is, for example, possible to have one logical antenna output provided to two different switching nodes 30. For example, an antenna element 20 can be shared simultaneously by two switching nodes 30, in some examples.

It will therefore be appreciated from the above examples that in some but not necessarily all examples the controller 40 is configured to determine the number and/or arrangement of switching nodes 30 used, the number and/or arrangement of antenna elements 20 used per switching node 30, and the number and type of streams of communication signals used. The controller 40 is also configured to control the extent to which antenna elements 20, switching nodes 30 and streams of communication signals are shared or not shared.

In each of the examples illustrated in FIGS. 12A to 14B, each switching node 30 is provided by a distinct radio frequency integrated circuit 116. Each distinct radio frequency integrated circuit (RFIC) 116 comprises multiple antenna feeds (interconnects) 32 to respective antenna elements of its associated subset 24 of antenna elements 20 and multiple mutually orthogonal ports 110 for communication with other radio frequency integrated circuits 116 that provide switching nodes 30.

The ports 110 include one or more ports $110_1$ facing direction+D1, one or more ports $110_2$ facing direction+D2, one or more ports $110_3$ facing direction−D1 and one or more ports $110_4$ facing direction−D2. The direction+D1 is orthogonal to direction+D2 and −D2 and direction−D1 is orthogonal to direction+D2 and −D2.

Consequently the ports $110_1$ are mutually orthogonal with ports $110_2$, $110_4$. The ports $110_2$ are mutually orthogonal with ports $110_3$, $110_1$. The ports $110_3$ are mutually orthogonal with ports $110_4$, $110_2$. The ports $110_4$ are mutually orthogonal with ports $110_1$, $110_3$.

There are N pairs of ports 110 on each side of the RFIC 116 for communication with other RFICs 116. N is the number of streams of communication signals. The pair of ports 110 on one side of the RFIC 116 provides for bidirectional communication for a particular communication stream with an adjacent RFIC 116. Consequently in this example there is a communication port 110 for input to the RFIC 116 per stream, per adjacent RFIC 116 and there is a port 110 for output from the RFIC 116 per stream per communication stream per adjacent RFIC 116.

Figure 15:
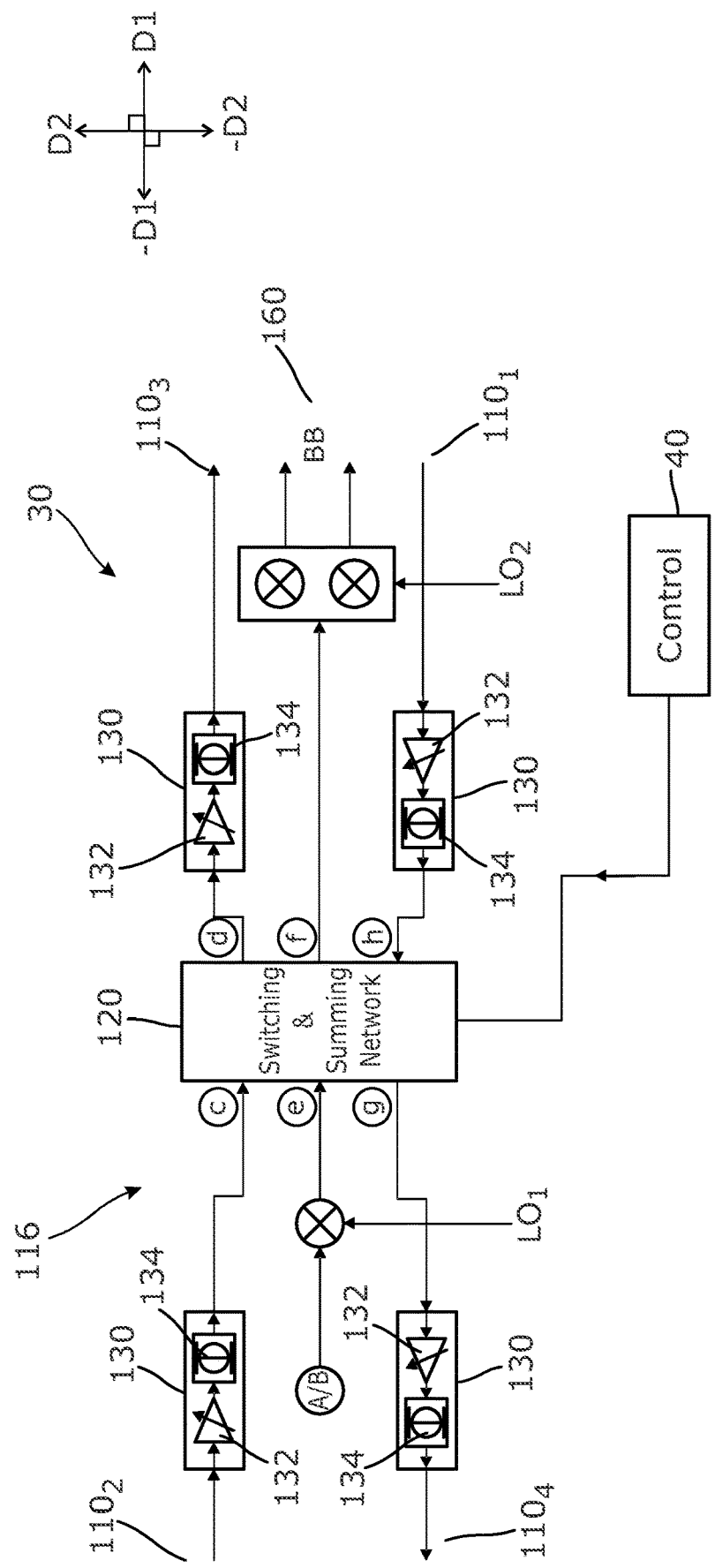
FIG. 15 shows another example embodiment of the subject matter described herein.

FIG. 15 illustrates in more detail an example of an RFIC 116 that operates as a switching node 30. In this example, the communication signals that are transferred in the first direction (+/−D1) are at a first frequency and the communication signals that are transferred in the second direction (+/−D2) are at a second different frequency. Consequently, the switching and summing and routing of the horizontal signals (first direction) is, in this example, independent of the switching and routing of the vertical communication signals in the second direction D2.

FIG. 15 illustrates the port 110 of the RFIC 116 for the horizontal (first direction) only. There is an input port $110_1$ for receiving communication signals in the −D1 direction from an RFIC 116 in the +D1 direction and an input port for receiving communication signals in the +D1 direction from an RFIC 116 in the −D1 direction. There is an output port $110_3$ for providing communication signals in the +D1 direction to the RFIC 116 in the +D1 direction and there is an output port $110_3$ for providing output communication signals in the −D1 direction to the RFIC 116 in the direction −D1.

In this example, but not necessarily all examples, the switching node 30 comprises circuitry 130 for each of the ports 110 for controlling gain 132 and phase 134 of the communication signal transferred via that port 110. In at least some other examples, such circuitry 130 can be provided outside the switching node 30.

In this example, but not necessarily all examples, the switching node 30 comprises routing circuitry 120 that is configured to be controlled by the controller 40 to perform different operations on the communication signals transferred via the ports 110.

In this example, but not necessarily all examples, the switching node 30 comprises conversion circuitry 150 for up-converting or down-converting a frequency of a received communication signal. This may be used to change a communication signal that is transferred at the first frequency into a communication signal at the second frequency so that it can be switched from the horizontal into the vertical interconnects 32. Alternatively, it may be used in the down-conversion of the analogue communication signals so that they can be transferred via a base band port 160 to base band circuitry.

In this example, but not necessarily all examples, the routing circuitry 120 can be controlled by the controller 40 to switch a communication signal received at one port 110 to be output from any other port 110, to sum communication signals received from multiple communication ports 110 and to provide the sum to any one or more output ports 110, to split a signal transferred from any communication port 110 so that it is output to multiple different output communication ports 110.

In some, but not necessarily all, examples, a communication signal can, for example, be passed through the switching node 30 to any output port 110, can be looped back or can be terminated. Termination can for example be termination to base band or termination to a controlled impedance.

The apparatus 10 described in the preceding examples can be used in many different applications. It may for example be used for multiple input multiple output (MIMO) or massive multiple input multiple output (mMIMO). The apparatus 10 can for example be used for beam steering where the antenna elements 20 are used as phase controlled elements in a phased antenna array. The apparatus 10 can be used to provide different gain or differential gain to different antenna elements 20 in response to varying radio environment information.

In some, but not necessarily all, examples, the operation of the switching node 30 and, in particular, the routing, can be based upon the application of different gains for different antenna elements 20 so that a required gain in a required pattern of antenna elements 20 is achieved. In other examples, the object may be to achieve a desired signal to noise ratio or other quality level. In other examples, it may be desired to avoid interference in a particular direction of arrival by controlling beam forming or to otherwise control a desired radiation pattern formed by the combination of used antenna elements 20. In still other examples, it may be desirable to achieve antenna diversity by using antenna elements 20 that are spatially separated or achieving polarization diversity or diversity in some other communication channel.

The apparatus 10 can, in some examples, be configured to be used in one or more mmW multi-band frequencies. It may, for example, be used for 5G communication.

The apparatus 10 may be used in a base station or in a mobile station, for example a mobile cellular telephone.

The apparatus 10 may be used in vehicles or hand portable devices.

The apparatus 10 may be used in stationary electronic equipment or mobile/hand portable electronic equipment.

The apparatus 10 may be used in small cells, customer premises equipment (CPE), data dongles etc.

Components described are operationally coupled and any number or combination of intervening elements can exist (including no intervening elements).

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The switching node 30 can be a module.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services, (in-door) radar systems.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   a set of antenna elements;
   switching nodes;
   wherein the switching nodes have physical interconnects to a sub-set of the antenna elements for transferring communication signals and the switching nodes have physical interconnects to other switching nodes forming a network of switching nodes for transferring communication signals between switching nodes; and
   a controller configured to control operation of switching nodes to control use of the physical interconnects between switching nodes and control creation of different patterns of antenna elements operationally interconnected via multiple operationally interconnected switching nodes,
   wherein the controller is configured to control operation of a switching node in order to cause communication signals to be transferred both along a physical interconnect to at least one antenna element of the sub-set and also along another physical interconnect to another switching node,
   wherein physical interconnects between switching nodes comprise first interconnects extending in a first direction and second interconnects extending in a second direction orthogonal to the first direction, and wherein the switching nodes are configured to frequency divide communication signals transferred on the first interconnects from communication signals transferred on the second interconnects.

2. An apparatus as claimed in claim 1, wherein the controller is configured to control switching nodes to enable a communication path via one or more switching nodes from any antenna element to any other antenna element.

3. An apparatus as claimed in claim 1, wherein the controller is configured to control a shape of a spatial distribution pattern of antenna elements used, and/or control a number of antenna elements in a spatial distribution pattern of antenna elements used and/or control a sparsity of antenna elements in a spatial distribution pattern of antenna elements used.

4. An apparatus as claimed in claim 1 wherein the antenna elements are distributed spatially in a two-dimensional array in rows and columns.

5. An apparatus as claimed in claim 1 wherein the sub-set of antenna elements is the same arrangement of the same multiple antenna element for the switching nodes.

6. An apparatus as claimed in claim 1, wherein the network of switching nodes is an evenly distributed mesh network, and wherein the switching nodes have physical interconnects only to their nearest neighbouring switching nodes.

7. An apparatus as claimed in claim 6, wherein the switching nodes are distributed spatially in a two-dimensional array in rows and columns.

8. An apparatus as claimed in claim 1, wherein at least a first switching node is configured to perform any one or more of the following operations:
switching one input to the first switching node into one output from the first switching node by routing;
switching multiple inputs to the first switching node into one output from the first switching node by summing;
switching one input to the first switching node into many outputs from the first switching node; or
terminating an input to the first switching node with an impedance.

9. An apparatus as claimed in claim 1, wherein at least a first switching node is configured to perform any one or more of the following operations:
controlling a phase shift for a transferred communication signal;
controlling amplitude of a transferred communication signal; or
controlling frequency conversion of a transferred communication signal.

10. An apparatus as claimed in claim 1, wherein physical interconnects between switching nodes are bi-directional enabling bi-directional communication between adjacent switching nodes.

11. An apparatus as claimed in claim 1, wherein the switching nodes have multiple parallel physical interconnects to other switching nodes forming multiple parallel networks of switching nodes for transferring multiple parallel streams of communication signals between switching nodes,
wherein at least two parallel streams are differentiated by one or more of:
different amplitude;
different steering direction;
different polarization; or
different frequency.

12. An apparatus as claimed in claim 1, wherein the switching nodes are provided by a distinct radio frequency integrated circuit comprising multiple antenna feeds to respective antenna elements of the sub-sets of antenna elements and multiple mutually orthogonal ports for communication with other radio frequency integrated circuits providing switching nodes.

13. A mobile cellular telephone or a base station comprising the apparatus of claim 1.

14. An apparatus comprising:
at least one processor; and
at least one memory including computer program code,
wherein the at least one memory and the computer program code are configured to, with the at least one processor, cause the apparatus at least to control operation of switching nodes, wherein the switching nodes have physical interconnects to a sub-set of antenna elements, wherein said apparatus is caused to control the operation of switching nodes to control use of physical interconnects between switching nodes and to control creation of different patterns of the antenna elements operationally interconnected via multiple operationally interconnected switching nodes, and wherein said apparatus is caused to control operation based on a target for at least one over-the air communication channel for transferred communication signals,
wherein the apparatus is caused to control use of the physical interconnects of a switching node in order to cause communication signals to be transferred both along a physical interconnect to at least one antenna element of the sub-set and also along another physical interconnect to another switching node,
wherein physical interconnects between switching nodes comprise first interconnects extending in a first direction and second interconnects extending in a second direction orthogonal to the first direction, and wherein the switching nodes are configured to frequency divide communication signals transferred on the first interconnects from communication signals transferred on the second interconnects.

15. An apparatus as claimed in claim 14, wherein the at least one memory and the computer program code are configured to, with the at least one processor, cause the apparatus to control switching nodes to enable a communication path via one or more switching nodes from any antenna element to any other antenna element.

16. An apparatus as claimed in claim 14, wherein the at least one memory and the computer program code are configured to, with the at least one processor, cause the apparatus to control a shape of a spatial distribution pattern of antenna elements used, and/or control a number of antenna elements in a spatial distribution pattern of antenna elements used and/or control a sparsity of antenna elements in a spatial distribution pattern of antenna elements used.

17. An apparatus as claimed in claim 14, wherein physical interconnects between switching nodes are bi-directional enabling bi-directional communication between adjacent switching nodes.

18. An apparatus as claimed in claim 14, wherein the switching nodes are provided by a distinct radio frequency integrated circuit comprising multiple antenna feeds to respective antenna elements of the sub-sets of antenna elements and multiple mutually orthogonal ports for communication with other radio frequency integrated circuits providing switching nodes.

* * * * *